United States Patent
Sutehall

(10) Patent No.: US 7,207,208 B2
(45) Date of Patent: Apr. 24, 2007

(54) BLOWN INSTALLATION OF OPTICAL FIBRES AND METHOD AND APPARATUS FOR DETERMINING THE LENGTH OF A PASSAGE ALONG WHICH AN OPTICAL FIBRE IS TO BE BLOWN

(75) Inventor: Ralph Sutehall, Newport (GB)

(73) Assignee: Prysmian Cables & Systems Limited, London (GB)

( * ) Notice: Subject to any disclaimer, the term of this patent is extended or adjusted under 35 U.S.C. 154(b) by 290 days.

(21) Appl. No.: 10/849,300

(22) Filed: May 20, 2004

(65) Prior Publication Data

US 2004/0231401 A1 Nov. 25, 2004

(30) Foreign Application Priority Data

May 21, 2003 (EP) .................... 03253191

(51) Int. Cl.
*G01B 13/08* (2006.01)
(52) U.S. Cl. .................... 73/37.5; 73/37.7; 73/37.9; 73/149; 385/147
(58) Field of Classification Search ............ 73/149, 73/37.5, 37.7, 37.9
See application file for complete search history.

(56) References Cited

U.S. PATENT DOCUMENTS

| | | | | |
|---|---|---|---|---|
| 2,329,363 | A | * | 9/1943 | Thomas ................ 137/495 |
| 3,839,899 | A | * | 10/1974 | McMillen ................ 73/38 |
| 4,567,923 | A | * | 2/1986 | Nalbach ................ 141/82 |
| 4,691,896 | A | * | 9/1987 | Reeve et al. ............ 254/134.4 |
| 4,796,970 | A | * | 1/1989 | Reeve et al. ............ 385/109 |
| 4,948,097 | A | * | 8/1990 | Reeve et al. ............ 254/134.4 |
| 4,952,021 | A | | 8/1990 | Aoki et al. |
| 4,976,519 | A | | 12/1990 | Davey et al. |
| 5,042,907 | A | | 8/1991 | Bell et al. |

(Continued)

FOREIGN PATENT DOCUMENTS

| | | |
|---|---|---|
| EP | 0 108 590 A1 | 5/1984 |
| FR | 2 799 280 | 4/2001 |
| GB | 2 082 778 A | 3/1982 |

OTHER PUBLICATIONS

Hiroyuki, T., "Measuring Method of Pipe Length", Patent Abstracts of Japan, JP Publication No. 61-025005, Feb. 3, 1986.

(Continued)

*Primary Examiner*—Hezron Williams
*Assistant Examiner*—Samir M. Shah
(74) *Attorney, Agent, or Firm*—Finnegan, Henderson, Farabow, Garrett & Dunner, L.L.P.

(57) ABSTRACT

An apparatus (12) is provided for use in determining a length at least representative of the length of a tube that defines a passage in an optical fibre cable (10) along which an optical fibre unit can be installed by blowing. The apparatus (12) comprises a pressure reservoir (32) in which a gas at a known pressure can be stored, outlet piping (34) connected with the pressure reservoir (32) and having an outlet end spaced from the reservoir for connection to a tube of the optical fibre cable (10). The apparatus has a pressure detecting arrangement (42) for detecting gas pressure in a tube connected with the outlet end of the outlet piping (34). In use, the gas stored in the pressure reservoir (32) is released into the tube and knowing the pressure of the gas when stored in the pressure reservoir, the volume of the reservoir and the pressure of gas in the tube after release of the gas from the pressure reservoir, it is possible to determine the volume of the passage defined by the tube and knowing that volume, it is possible to determine the length of the tube.

27 Claims, 2 Drawing Sheets

U.S. PATENT DOCUMENTS

| | | | |
|---|---|---|---|
| 5,121,901 A * | 6/1992 | Cassidy et al. | 254/134.4 |
| 5,169,126 A * | 12/1992 | Reeve et al. | 254/134.4 |
| 5,456,450 A * | 10/1995 | Reeve et al. | 254/134.4 |
| 5,533,164 A | 7/1996 | Preston et al. | |
| 5,610,323 A * | 3/1997 | Ashworth | 73/49.1 |
| 5,645,267 A * | 7/1997 | Reeve et al. | 264/134.4 |
| 5,760,294 A | 6/1998 | Lehmann | |
| 5,918,271 A * | 6/1999 | McGuigan | 73/49.1 |
| 6,101,304 A | 8/2000 | Quistorff et al. | |
| 6,173,107 B1 * | 1/2001 | Reeve et al. | 385/147 |
| 6,243,657 B1 | 6/2001 | Tuck et al. | |
| 6,311,267 B1 | 10/2001 | Nguyen et al. | |
| 6,311,953 B1 | 11/2001 | Lang et al. | |
| 6,328,283 B1 * | 12/2001 | Reeve et al. | 254/134.4 |
| 6,801,696 B2 | 10/2004 | Davis et al. | |
| 6,876,800 B2 | 4/2005 | Sutehall et al. | |
| 7,024,919 B2 * | 4/2006 | Arima et al. | 73/40.5 R |
| 2002/0128783 A1 | 9/2002 | Marcu et al. | |
| 2003/0056607 A1 | 3/2003 | Aronstam | |
| 2003/0123824 A1 | 7/2003 | Tatarka et al. | |
| 2005/0005679 A1 * | 1/2005 | Dingfelder et al. | 73/37.5 |

OTHER PUBLICATIONS

Radius Systems, "MiniGlide & MicroGlide; Blown Fibre Cabling Systems", Uponor, 3 pages, (2002).

Sirocco, "EPFU (Enhanced Performance Fibre Unit)", Pirelli Telecom Cables & Systems UK Ltd., Mar. 4, 2002, 3 sheets.

John Guest, "John Guest Product Ranges: Fibre Optic Fittings", John Guest—The World Leader in Push-in Fittings, Pipe and Plastic Plumbing Systems, http://www.johnguest.com/part_spec.asp?s=FIBRE, pp. 1-3, May 19, 2003.

* cited by examiner

US 7,207,208 B2

BLOWN INSTALLATION OF OPTICAL FIBRES AND METHOD AND APPARATUS FOR DETERMINING THE LENGTH OF A PASSAGE ALONG WHICH AN OPTICAL FIBRE IS TO BE BLOWN

CROSS REFERENCE TO RELATED APPLICATIONS

This application claims the priority of European Patent Application No 03 253191.5, filed 21 May 2003, the content of which is incorporated herein by reference.

1. Field of the Invention

The invention relates to blown installation of optical fibres and in particular to determining the length of a passage along which an optical fibre unit is to be installed by blowing. The invention is particularly, but not exclusively, for determining the length of a passage defined by tubes in an optical fibre cable into which optical fibre units are to be installed by blowing.

2. Background to the Invention

Typically, blown fibre installations comprise an optical fibre cable containing empty tubes into which an optical fibre unit is installed by blowing with compressed air. The installation of optical fibres by blowing along passages in a pre-installed cable is known from, for example, EP-A-0 108 590. The cables are often installed a long time before the optical fibre units are blown in and the optical fibre units will often be installed by someone other than the installer of the cable. As a consequence, the person installing the optical fibre unit is quite likely to be unaware of the length of the cable.

It may be possible to determine the cable length by reference to length markings on the cable sheath. This method is only satisfactory if the cable has come from a single drum and the sheath markings are readily accessible. However, the optical fibre unit installer cannot usually be sure whether or not the cable has come from a single drum. Another method for determining the length of the cable is to use a measuring wheel. However, if the cable is installed in a building, it will quite likely be hidden under the floor or above a false ceiling, making the use of a measuring wheel impracticable and in many cases, impossible. The same considerations apply whenever a cable is in someway buried when installed.

A presently used method of determining the length of a cable is to install an optical fibre unit into one tube of the cable and record the length for future installations. However, this method has the disadvantages that the initial installation is made without knowing the length of the cable and that the recorded measurement may be lost.

SUMMARY OF THE INVENTION

It is an object of the invention to enable an installer of optical fibre units to determine the length of a passage or tube into which an optical fibre unit is to be installed by blowing.

The invention provides a method determining a length $L_t$ at least representative of the length of a tube that defines a passage in an optical fibre cable along which an optical fibre unit can be installed by blowing, said, method comprising the steps of providing a first volume $V_1$ containing a gas at a first pressure $P_1$, releasing said gas into a second volume $V_2$ that comprises said passage, determining a second gas pressure $P_2$ in said second volume $V_2$ after release of said gas from said first volume, determining said second volume $V_2$ by reference to said first pressure $P_1$, second pressure $P_2$ and said first volume $V_1$ and determining said length $L_t$ by reference to said second volume $V_2$.

The invention also includes a method of determining a length at least representative of the length of a tube in an optical fibre cable along which an optical fibre unit can be installed by blowing, the optical fibre cable having a first end and a second end and comprising sheathing housing at least one said tube and the method comprising:

connecting a pressure reservoir having a known volume with the or one said tube at said first end of the optical fibre cable;

providing sealing at said second end of the optical fibre cable such that an end of said tube connected to the pressure reservoir is sealed at said second end of the optical fibre cable;

releasing a gas at a known pressure from said pressure reservoir into said tube connected with said pressure reservoir;

determining a pressure of the gas that is in said tube connected with said pressure reservoir after said release of gas;

determining the volume of said tube connected with said pressure reservoir by reference to said known volume, known pressure and determined pressure; and determining a length at least representative of the length of said tube connected with said pressure reservoir by reference to said volume thereof and an inside diameter thereof.

The invention also includes optical fibre cable length determining apparatus for use in determining a length at least representative of the length of a tube that defines a passage in an optical fibre cable along which an optical fibre unit can be installed by blowing, said apparatus comprising a pressure reservoir in which a gas at a known pressure can be stored, outlet piping connected with said pressure reservoir and having an outlet end spaced from said reservoir for connection to said tube and a pressure detecting arrangement for detecting gas pressure in said tube connected with said outlet end.

The invention also includes a method of determining a length $L_t$ at least representative of the length of a passage along which an optical fibre unit can be installed by blowing, said method comprising the steps of providing a first volume $V_1$ containing a gas at a first pressure $P_1$, releasing said gas into a second volume $V_2$ that comprises said passage, determining a second gas pressure $P_2$ in said second volume $V_2$ after release of said gas from said first volume, determining said second volume $V_2$ by reference to said first pressure $P_1$, second pressure $P_2$ and said first volume $V_1$ and determining said length $L_t$ by reference to said second volume $V_2$.

BRIEF DESCRIPTION OF THE DRAWINGS

In order that the invention may be well understood, embodiments thereof, which are given by way of example only, will now be described with reference to the drawings, in which.

DESCRIPTION OF THE EMBODIMENTS

Figure 1:
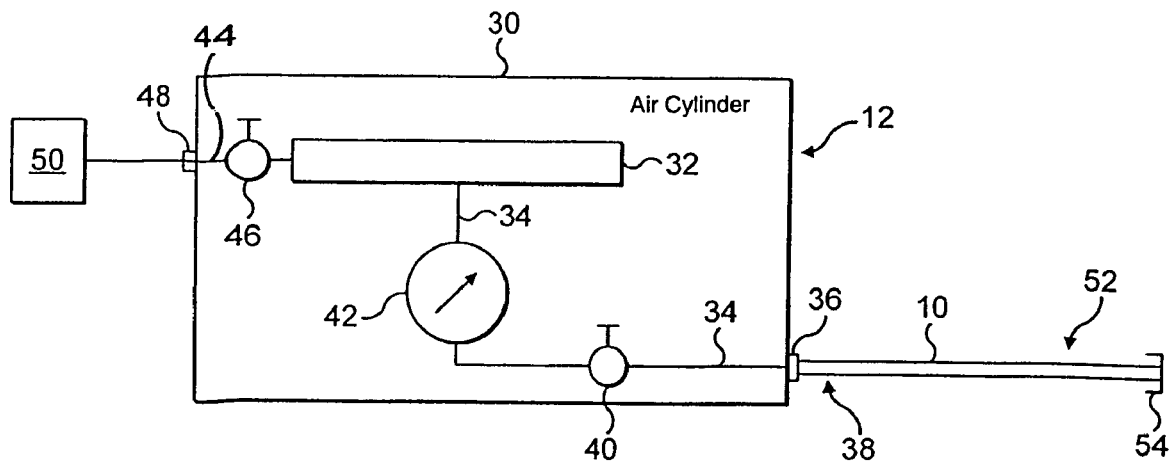
FIG. 1 is a schematic illustration of an optical fibre cable and an optical fibre cable length determining apparatus for determining the length of a tube in the cable.
Figure 2:
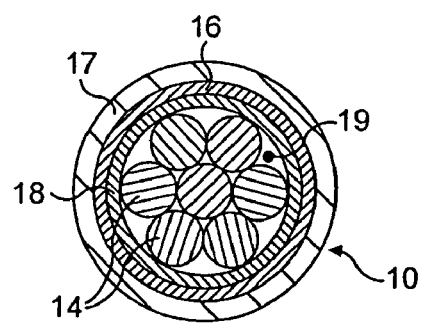
FIG. 2 is a schematic cross-section of an optical fibre cable for use in blown fibre installation.
Figure 3:
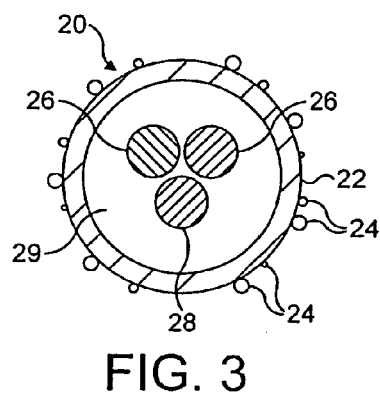
FIG. 3 is a schematic cross-section of an optical fibre unit suitable for installation in the optical fibre cable of FIG. 2.

Referring to FIGS. 1 to 3, an optical fibre cable 10 is shown connected to an optical fibre cable length determining apparatus 12 for determining the length of a tube or conduit 14 (FIG. 2) that extends along the length of the optical fibre cable. The tube 14 is empty prior to the installation of an optical fibre unit.

The optical fibre cable 10 may be of any suitable type that includes at least one tube 14 along which optical fibre units may be installed by blowing. An example of a suitable cable construction is shown in FIG. 2. The cable 10 shown in FIG. 2 comprises seven tubes 14 encased in an MDPE inner sheath 16 and an HDPE outer sheath 17. An aluminium water barrier 18 may be provided between the tubes 14 and the inner sheath 16. A rip cord 19 may also be provided. The tubes 14 may, for example, be made of polyethylene with a carbon-loaded radially inner surface to increase conductivity, as disclosed in U.S. Pat. No. 4,952,021. Examples of commercially available optical fibre cables that may be used are the MiniGlide™ and MicroGlide™ blown fibre systems supplied by Radius Plastics Limited and the MHT Fibre-Flow (trade name) range supplied by Emtelle International Limited.

By way of example, the tubes 14 may have an outside diameter of up to 8 mm with an inside diameter of up to 6 mm. In one embodiment the tube has an inside diameter of approximately 3.5 mm. Typically, the optical fibre units will have an outside diameter substantially in the range of 1 to 1.6 mm. However, it is to be understood that none of these figures is exact and none is to be taken as limiting.

There are many types of optical fibre units suitable for installation by blowing. These will be known to those skilled in the art and include enhanced performance fibre units (EPFU) such as the Sirocco® SM2F, SM4F and SM8F EPFUs made and sold by companies from the Pirelli group. A cross-section of an EPFU 20 from the Sirocco® SM2F range is shown in FIG. 3. The EPFU 20 comprises a resin sheath 22 covered with a surface modifier comprising glass beads 24 that enhance the blowability of the EPFU by reducing the coefficient of friction of the EPFU. The sheath 22 houses a number of optical fibres 26, in this case two, and a ripcord 28, all embedded in a matrix 29 of a material that is relatively soft compared with the sheath 22. EPFUs in the Sirocco® range have nominal outside diameters in the range 1.2 to 1.4 mm, have blowing distances in the range 500 to 1000 m and typically include two to eight optical fibres.

The optical fibre cable length determining apparatus 12 comprises a housing 30 to which is mounted a pressure reservoir in the form of a compressed air cylinder 32 of known volume $V_1$ for containing compressed air. The compressed air cylinder 32 is connected to outlet piping 34 that extends to a connector 36. The connector 36 may be of any type suitable for making a sealed connection to the upstream end 38 of a tube 14 in the cable 10. An isolation valve 40 and a pressure gauge 42 are fitted into the outlet piping 34 between the cylinder 32 and the connector 36.

An inlet pipe 44 is connected to the compressed air cylinder 32. An inlet valve 46 is provided in the inlet pipe 44, which at its upstream end has a connector 48 by which the pipe can be connected with means 50 for providing pressurised air to fill the compressed air cylinder 32. That means 50 could, for example, be an airline system in a building, a portable compressor or a large volume gas cylinder, whichever is convenient for a particular measuring task and environment. The valves 40, 46 may be any type of valve suitable for controlling the flow of a gaseous fluid. Similarly, the piping 34, 44 may be of any type suitable for conveying compressed air at the operating pressures of the system and the pressure gauge 42 may be of any type suitable for use with compressed air and capable of detecting pressure changes within operating range of the apparatus.

In use, the connector 36 is connected to the upstream, or first, end 38 of a tube 14 of the optical fibre cable 10 and the downstream, or second, end 52 of the optical fibre cable 10 is capped with an approved pressure retaining cap 54, such as the NC711-02 and NC712-02 end stops supplied by John Guest Ltd of West Drayton, Middlesex in the United Kingdom. These end stops are plastics end caps designed for use in the telecommunications market. Specifically, the end caps comprise a plastics body carrying one or more O-rings designed to fit on a particular diameter tube 14. The plastics body has a rotatable end portion and rotation of this end portion causes the O-ring to be clamped firmly onto the tube 14.

The inlet valve 46 is opened with the isolation valve 40 closed and the compressed air cylinder 32 is filled with compressed air to a predetermined pressure $P_1$ (for example 10 Bar–1000 Kn/m²). Once the required pressure is reached, the inlet valve 44 is closed and the isolation valve 40 is opened, thus releasing the compressed air into the tube 14. Once the pressure $P_2$ in the system downstream of the inlet valve 46 has stabilised, the pressure $P_2$ is determined from the pressure gauge 42.

The air in the system can be considered to be an ideal gas and since its temperature before and after release from the compressed air cylinder will for practical purposes be a constant, Boyle's law applies. Therefore $$PV=n$$

where:
P=pressure
V=volume
n=a constant
From this relationship it can be determined that $$P_1V_1=P_2V_2$$

where:
$P_1$=cylinder pressure
$V_1$=cylinder volume
$P_2$=pressure between inlet valve 46 and retaining cap 54 after release of compressed air from the cylinder 32
$V_2$=volume between inlet valve 46 and retaining cap 54
Since $$\frac{P_1V_1}{P_2}=V_2$$

it is possible to determine the volume $V_t$ of the tube 14 by subtracting the known volume of the cylinder $V_1$ from the volume $V_2$. It will be appreciated that this calculation does not take account of the volume (i) of the inlet pipe 44 between the inlet valve 46 and the compressed air cylinder 32, (ii) the piping 34 between the compressed air cylinder and the connector 36, (iii) the isolation valve 40 or (iv) the pressure gauge 42. However, in terms of the volume $V_t$ of the tube 14, which could, for example be 500 m to 1000 m, or more, long, these volumes are negligible and can be discounted. Obviously, it would be possible to determine these unknown volumes and add them to $V_1$ if this was desired in order to arrive at a more accurate result, but for practical purposes, this is not considered necessary.

Since the inside diameter d of the tube 14 can readily be determined by measurement and the volume $V_t$ of the tube 14 has been determined, it is possible to determine the length $L_t$ of the tube, since $$V_t = \frac{\pi d^2}{4} L_t$$

and therefore $$\frac{4V_t}{\pi d^2} = L_t \text{ or } \frac{4(V_2 - V_1)}{\pi d^2} = L_t$$

Figure 4:
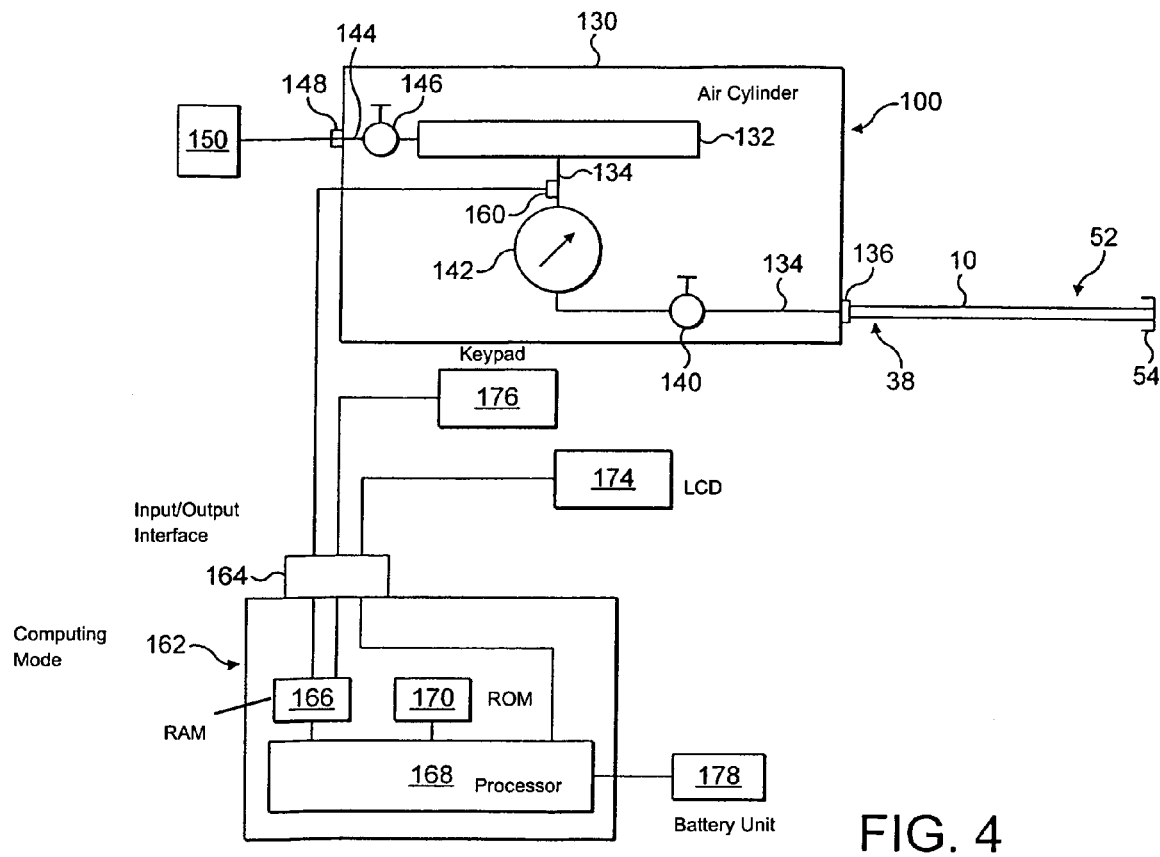
FIG. 4 is a schematic illustration of a modified version of the apparatus shown in FIG. 1.

It will be appreciated that knowing the pressures $P_1$ and $P_2$, the volume $V_1$ and the diameter d of the tube 14, the installer can readily carry out the calculations necessary to determine the tube length $L_t$. However, it may be desirable to provide the apparatus 12 with onboard computing means so that the length can be computed and the result displayed for the installer. For this purpose, a modified apparatus 100 as shown in FIG. 4 can be provided.

In the modified apparatus 100, components equivalent to those described in connection with the apparatus 12 are given the same reference numeral, but incremented by 100 and will not be described again in any detail.

The apparatus 100 includes a pressure transducer 160 which can be situated at any appropriate position at which it can sense the pressures $P_1$ and $P_2$. The pressure transducer 160 provides a signal indicative of the pressure sensed and communicates the signal to a computing module 162 via an input/output interface 164, which may include an analogue to digital (a/d) converter. The input/output interface 164 is connected to a random access memory (RAM) 166 in which signals from the pressure transducer 160 can be stored for access by a processor (CPU) 168. The computing module 162 also comprises a read only memory (ROM) 170 in which known parameters such as the volume $V_1$ of the compressed air cylinder 18 are stored. The CPU 168 outputs digital data to the input/output interface 164, which is connected to a display means, which may for example be an LCD 174. The computing module is also provided with an input device, such as a keypad 176, by means of which the installer may input data, such as the diameter of the tube 14. The keypad 176 is connected to the RAM 166 via the input/output interface 164 from where the data input by the user can be accessed by the CPU 168.

The computing module 162 may be powered by a battery unit 178 and the keypad 176 may include an on/off switch (not shown) so that the computing module 162 can be switched off to conserve battery power. A suitable converter (not shown) may be provided between the battery unit 178 and the components of the computing module 162 that require electrical power so that each receives electrical energy in the required form.

The ROM 170 will store suitable software for operating the computing module 162, including an algorithm for determining the length $L_t$ of the tube 14 from the data received in and stored by the RAM 166 and ROM 170. The algorithm would typically include steps that would produce on the LCD prompts for the installer to carry out each stage of the process (i.e. fill the cylinder 32, 132, open the isolation valve 40, 140, input the tube diameter d). More sophisticated systems may allow the installer to select the measurement units to be used.

It will be appreciated that the components of the computing module 162 have been described in brief and that other components may be included. However, such additional components and the implementation of a suitable algorithm will all be readily apparent to those skilled in the art and will not therefore be described in any detail.

It will be appreciated that the various components of the computing module 162 may be provided in or on the housing 130. Alternatively, a separate unit with a cable for establishing an electrical connection to the pressure transducer 160 may be provided. As a further alternative, a hand held unit comprising all of the features of the computing module 162, except the transducer 160 may be provided. In this case, the installer would merely have to input the pressures $P_1$ and $P_2$ read from the pressure gauge 42,142 and the diameter d of the tube 14 in order to have the tube length $L_t$ displayed on the LCD 174. Again, a suitable algorithm would be stored in the ROM 170 to control the unit, provide the installer with prompts for the input of necessary data and carry out the necessary calculations.

In the embodiments, only one compressed air cylinder 32, 132 is shown. However, two or more cylinders can be provided as desired. Two or more cylinders are provided in order to provide a sufficient volume for testing longer optical fibre cables. This avoids having to work at elevated gas pressures in order to provide sufficient gas in a smaller volume. By providing suitable connections and valving between multiple cylinders, a variable volume pressure reservoir is provided for testing cables of different lengths. Thus in one mode, the volume V1 would be provided by one cylinder for measuring relatively shorter cables, while in a second mode, the volume V1 would be provided by two or more cylinders for measuring the length of relatively longer cables.

It will be appreciated that the apparatus 12, 100 provide a means for quickly and easily determining the length of a tube 14 prior to installation of an optical fibre unit. Thus the installer can ensure that the length of optical cable unit available is sufficient for the purpose and set the parameters of the blowing process to ensure reliable installation of the optical fibre unit. A further feature of the apparatus is that by observing the pressure gauge 42,142 after the compressed air from the cylinder 32, 132 has been released, the integrity of the installation route can be determined. If the pressure $P_2$ does not stabilise, but continues to fall, this is an indication of an air leak. This could be the result of a faulty connection or a fault in the tube 14. If there is fault in the tube, this is likely to severely limit the distance the optical fibre unit can be blown and the installer may therefore choose to use another tube 14 if space is available, or may have to consider breaking into the cable along the installation route to install sections of optical fibre unit for splicing together.

The volume $V_1$ of the cylinder 32, 132 and the pressure $P_1$ may be selected as required for the applications for which the apparatus is to be used. It will be appreciated that the figure of 10 Bar mentioned above is purely by way of example and all that is necessary is to ensure there is sufficient mass of gas in the cylinders to produce a measurable change in pressure from $P_1$ to $P_2$ taking into account the resolution of the pressure gauge 42, 142 and/or the pressure transducer 162 and the desired accuracy of the measurement.

It will be understood that although the preferred gas for use with the apparatus is compressed air, in principle, any suitable gas might be used.

As mentioned above, in the embodiment, the volumes of the piping, valves and pressure gauge are not taken into account in determining the length $L_t$ of the tube. For practical purposes the effect of these volumes of the result is irrelevant. It has been found in tests on a prototype apparatus 12 that the length $L_t$ can be calculated with an accuracy of 95%. An accuracy of 95% is considered to provide a value sufficiently representative of the actual length of the tube passage for practical purposes.

It will be appreciated that knowing the pressures $P_1$ and $P_2$, the volume $V_1$ and the diameter d of the passage, the installer can readily carry out the calculations necessary to determine the length $L_t$ of the passage. As an alternative to having the installer calculate the length $L_t$, graphs for different diameters of passage with pressure $P_2$ plotted against length for a specified pressure $P_1$ and volume $V_1$ could be supplied so that the installer would simply read the length off of the graph with reference to the pressure $P_2$. As yet another alternative, lookup tables could be provided allowing the installer to determine the passage length from the pressure $P_2$ for a particular diameter, volume $V_1$ and pressure $P_1$. It will be appreciated that the data contained in such graphs or lookup tables could be stored in the ROM of a computing module, which could then determine the passage length by reference to lookup tables stored in the ROM instead of calculating the length.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A method of determining a length $L_1$ at least representative of the length of a tube that defines a passage in an optical fibre cable along which an optical fibre unit can be installed by blowing, said method comprising the steps of providing a first volume $V_1$ containing a gas at a first pressure $P_1$, releasing said gas into a second volume $V_2$ that comprises a tube that defines a passage in an optical fibre cable, determining a second gas pressure $P_2$ in said second volume $V_2$ after release of said gas from said first volume, determining said second volume $V_2$ by reference to said first pressure $P_1$, said second pressure $P_2$ and said first volume $V_1$ and determining said length $L_1$ by reference to said second volume $V_2$.

2. A method as claimed in claim 1, wherein said second volume comprises said passage and said first volume $V_1$.

3. A method as claimed in claim 2, wherein said second volume is determined from the relationship $$\frac{P_1 V_1}{P_2} = V_2$$

wherein a temperature of said gas is held substantially constant.

4. A method as claimed in claim 1, wherein said length $L_1$ is determined from the relationship $$L_1 = \frac{4(V_2 - V_1)}{\cdot d^2}$$

where d is a diameter of said passage.

5. A method as claimed in claim 1, wherein said first volume $_{pt}$ comprises a volume $V_1$ defined by a pressure reservoir.

6. A method as claimed in claim 5, wherein first volume $V_1$ is equal to said volume $V_p$ of said pressure reservoir.

7. A method as claimed in claim 1, wherein said second $V_2$ and/or said length $L_1$ is/are determined by a computing module.

8. A method as claimed in claim 1, further comprising monitoring said pressure $P_2$ to determine the presence of gas leakage.

9. A method as claimed in claim 1, further comprising providing a plurality of discrete volumes for containing gas at said first pressure $P_1$, selecting said first volume $V_1$ based on an assumed said length $L_1$ and arranging a connection between said discrete volumes to provide said selected first volume $V_1$.

10. A method of determining a length at least representative of the length of a tube in an optical fibre cable along which an optical fibre unit can be installed by blowing, the optical fibre cable having a first end and a second end and comprising sheathing housing said tube and the method comprising:
    connecting a pressure reservoir having a known volume one said tube at said first end of the optical fibre cable;
    providing sealing at said second end of the optical fibre cable such that an end of said tube connected to the pressure reservoir is sealed at said second end of the optical fibre cable;
    releasing a gas at a known pressure from said pressure reservoir into said tube connected with said pressure reservoir;
    determining a pressure of the gas that is in said tube connected with said pressure reservoir after said release of gas;
    determining the volume of said tube connected with said pressure reservoir by reference to said known volume, known pressure and determined pressure; and
    determining a length at least representative of the length of said tube connected with said pressure reservoir by reference to said determined volume and an inside diameter of said tube.

11. A method as claimed in claim 10, further comprising filling said pressure reservoir with said gas to said known pressure.

12. A method as claimed in claim 10, further comprising monitoring said pressure in said tube connected with said pressure reservoir after said release of gas to determine the presence of gas leakage.

13. A method as claimed in claim 10, comprising the step of determining said volume of said tube connected with said pressure reservoir by means of the relationship $$\frac{P_1 V_1}{P_2} = V_2.$$

where
    $P_1$ is said known pressure
    $P_2$ is said determined pressure $V_1$ is said known volume $V_2$ is at least substantially equal to the sum of $V_1$ and the volume of said tube connected with said reservoir.

14. A method as claimed in claim 13, comprising the step of determining said length at least representative of said length of the tube connected to said pressure reservoir by means of the relationship $$\frac{4(V_2 - V_1)}{\pi d^2} = L_t.$$

where $L_1$ is said length d is a diameter of said tube.

15. A method as claimed in claim 1 or claim 10, wherein said gas is compressed air.

16. Optical fibre cable length determining apparatus for use in determining a length at least representative of the length of a tube that defines a passage in an optical fibre cable along which an optical fibre unit can be installed by blowing, said apparatus comprising:

a pressure reservoir in which a gas at a known pressure can be stored;

outlet piping connected with said pressure reservoir and having an outlet end spaced from said reservoir for connection to said tube;

a pressure detecting arrangement for detecting gas pressure in said tube connected with said outlet end; and a computing unit connected or connectable with said pressure detecting arrangement, said computing unit being arranged for use in determining said length of said tube on the basis of pressure detected by said pressure detecting arrangement and an input measurement of the diameter of said tube.

17. Apparatus as claimed in claim 16, wherein said pressure detecting arrangement comprises a transducer that provides an electrical signal indicative of said pressure.

18. Apparatus as claimed in claim 16, wherein said pressure detecting arrangement comprises a display that provides a visual indication of said pressure.

19. Apparatus as claimed in claim 16, further comprising valving provided in said outlet piping between said pressure reservoir and said outlet end, said pressure detecting arrangement being arranged to detect said gas pressure between said pressure reservoir and said valving.

20. Apparatus as claimed in claim 16, further comprising inlet piping connected with said pressure reservoir, said inlet piping having an inlet end spaced from said pressure reservoir for connection with means for filling said pressure reservoir with gas.

21. Apparatus as claimed in claim 20, further comprising valving provided in said inlet piping between said pressure reservoir and said inlet end.

22. Apparatus as claimed in claim 16, wherein said pressure reservoir comprises a prefilled cartridge releasably connectable to said outlet piping.

23. Apparatus as claimed in claim 16, wherein said pressure detecting arrangement is arranged to detect gas pressure in said pressure reservoir for detecting pressure of a gas stored in said reservoir.

24. Apparatus as claimed in claim 16, wherein said pressure reservoir comprises a plurality of units each defining a volume for storing gas, said units being selectively connectable such that, in use, a user can select a volume for said pressure reservoir by varying the number of said units that are connected.

25. An installation comprising an optical fibre cable comprising at least one tube defining a passage along which an optical fibre can be installed by blowing and apparatus comprising a pressure reservoir in which a gas at a known pressure can be stored;

outlet piping connected with said pressure reservoir and having an outlet end spaced from said reservoir for connection to said tube;

a pressure detecting arrangement for detecting gas pressure in said tube connected with said outlet end; and a computing unit connected or connectable with said pressure detecting arrangement, said computing unit being arranged for use in determining said length of said tube on the basis of pressure detected by said pressure detecting arrangement and an input measurement of the diameter of said passage, said apparatus having said outlet end connected with a first end of said tube of said cable.

26. A method of determining a length $L_1$ at least representative of the length of a passage along which an optical fibre unit can be installed by blowing, said method comprising the steps of providing a first volume $V_1$ containing a gas at a first pressure $P_1$, releasing said gas into a second volume $V_2$ that comprises a passage, determining a second gas pressure $P_2$ in said second volume $V_2$ after release of said gas from said first volume, determining said second volume $V_2$ by reference to said first pressure $P_1$, said second pressure $P_2$ and said first volume $V_1$ and determining said length $L_1$ by reference to said second volume $V_2$.

27. A method as claimed in claim 26, wherein said length $L_1$ is determined from the relationship $$L_t = \frac{4(V_2 - V_1)}{\pi d^2}$$

where d is a diameter of said passage.

* * * * *

UNITED STATES PATENT AND TRADEMARK OFFICE
CERTIFICATE OF CORRECTION

PATENT NO. : 7,207,208 B2
APPLICATION NO. : 10/849300
DATED : April 24, 2007
INVENTOR(S) : Sutehall It is certified that error appears in the above-identified patent and that said Letters Patent is hereby corrected as shown below:

Claim 5, column 8, line 8, "volume$_{pt}$" should read --volume $V_1$--.

Claim 10, column 8, line 31, "one said tube" should read --with said tube--.

Claim 14, column 9, line 10, in the equation, "$\frac{4(V_2 - V_1)}{\pi d^2} = L_t.$" should read -- $\frac{4(V_2 - V_1)}{\cdot d^2} = L_t.$ --.

Claim 27, column 10, line 50, in the equation, "$\frac{4(V_2 - V_1)}{\pi d^2} = L_t.$" should read -- $\frac{4(V_2 - V_1)}{\cdot d^2} = L_t.$ --.

Signed and Sealed this

Eighteenth Day of December, 2007

JON W. DUDAS
*Director of the United States Patent and Trademark Office*